United States Patent
Lee et al.

(10) Patent No.: US 12,283,662 B2
(45) Date of Patent: Apr. 22, 2025

(54) ALL-SOLID-STATE BATTERY COMPRISING A PRE-LITHIATED SILICON NEGATIVE ELECTRODE

(71) Applicants: LG ENERGY SOLUTION, LTD., Seoul (KR); THE REGENTS OF THE UNIVERSITY OF CALIFORNIA, Oakland, CA (US)

(72) Inventors: Jeongbeom Lee, Daejeon (KR); Min Sang Song, Daejeon (KR); Ying Shirley Meng, San Diego, CA (US); So-Yeon Ham, San Diego, CA (US)

(73) Assignees: LG ENERGY SOLUTION, LTD., Seoul (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/470,746

(22) Filed: Sep. 20, 2023

(65) Prior Publication Data
US 2025/0055024 A1    Feb. 13, 2025

Related U.S. Application Data

(60) Provisional application No. 63/518,274, filed on Aug. 8, 2023.

(51) Int. Cl.
*H01M 10/0562* (2010.01)
*H01M 4/134* (2010.01)
*H01M 4/62* (2006.01)
*H01M 10/058* (2010.01)

(52) U.S. Cl.
CPC ....... *H01M 10/0562* (2013.01); *H01M 4/134* (2013.01); *H01M 4/622* (2013.01); *H01M 10/058* (2013.01)

(58) Field of Classification Search
None
See application file for complete search history.

(56) References Cited

U.S. PATENT DOCUMENTS

| | | |
|---|---|---|
| 2005/0130043 A1 | 6/2005 | Gao et al. |
| 2010/0099029 A1* | 4/2010 | Kinoshita ......... H01M 10/0525 429/316 |
| 2010/0120179 A1* | 5/2010 | Zhamu ................. H01M 4/625 257/E21.001 |
| 2016/0361899 A1 | 12/2016 | Iwasaki |
| 2019/0115815 A1 | 4/2019 | Kwon et al. |
| 2021/0126250 A1 | 4/2021 | Jiang et al. |
| 2022/0158171 A1 | 5/2022 | Ryu et al. |
| 2024/0154105 A1 | 5/2024 | Hirase et al. |

FOREIGN PATENT DOCUMENTS

| | | | |
|---|---|---|---|
| JP | 2012-79613 A | 4/2012 | |
| JP | 6865863 B2 | 4/2021 | |
| KR | 10-2006-0056969 A | 5/2006 | |
| KR | 10-2016-0047301 A | 5/2016 | |
| KR | 10-1834072 B1 | 3/2018 | |
| KR | 10-2018-0036413 A | 4/2018 | |
| KR | 10-2019-0041737 A | 4/2019 | |
| KR | 10-2019-0083304 A | 7/2019 | |
| KR | 10-2020-0129383 A | 11/2020 | |
| WO | WO-2018191843 A1 * | 10/2018 | .......... H01M 10/052 |
| WO | WO 2023/007919 A1 | 2/2023 | |

OTHER PUBLICATIONS

Machine translation of WO 2018/191843, published on Oct. 25, 2018 (Year: 2018).*
Yubuchi, S., Uematsu, M., Deguchi, M., Hayashi, A., Tatsumisago, M.—Lithium-Ion Conducting Argyrodite-Type Li6PS5X (X=Cl, Br, I) Solid Electrolytes Prepared by a Liquid-Phase Technique Using Ethanol as a Solvent, ACS Appl. Energy Mater 2018, 1, pp. 3622-3629 (Year: 2018).*

* cited by examiner

*Primary Examiner* — Anca Eoff
(74) *Attorney, Agent, or Firm* — Birch, Stewart, Kolasch & Birch, LLP

(57) ABSTRACT

Disclosed is a negative electrode for an all-solid-state battery and an all-solid-state battery including the negative electrode. More specifically, disclosed is a pre-lithiated silicon negative electrode, and an all-solid-state battery comprising the same.

10 Claims, 3 Drawing Sheets

[Fig. 1]
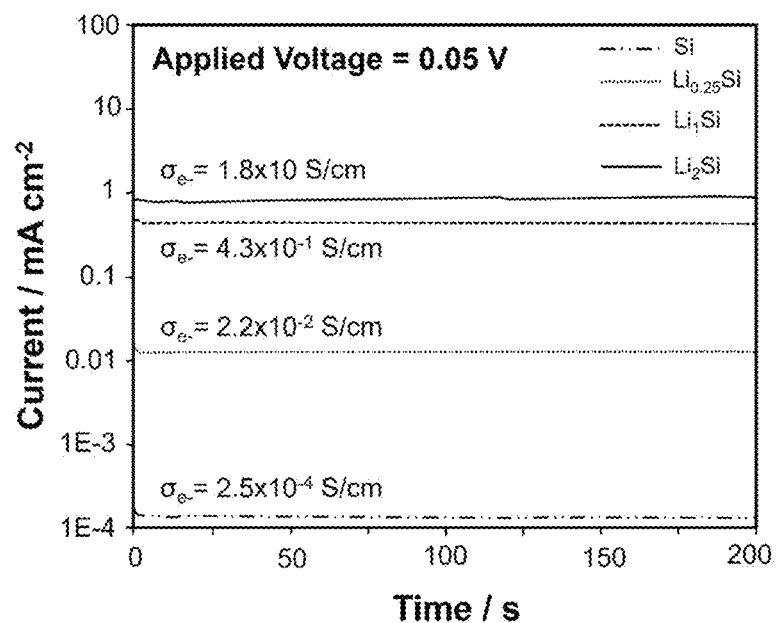
[Fig. 2]
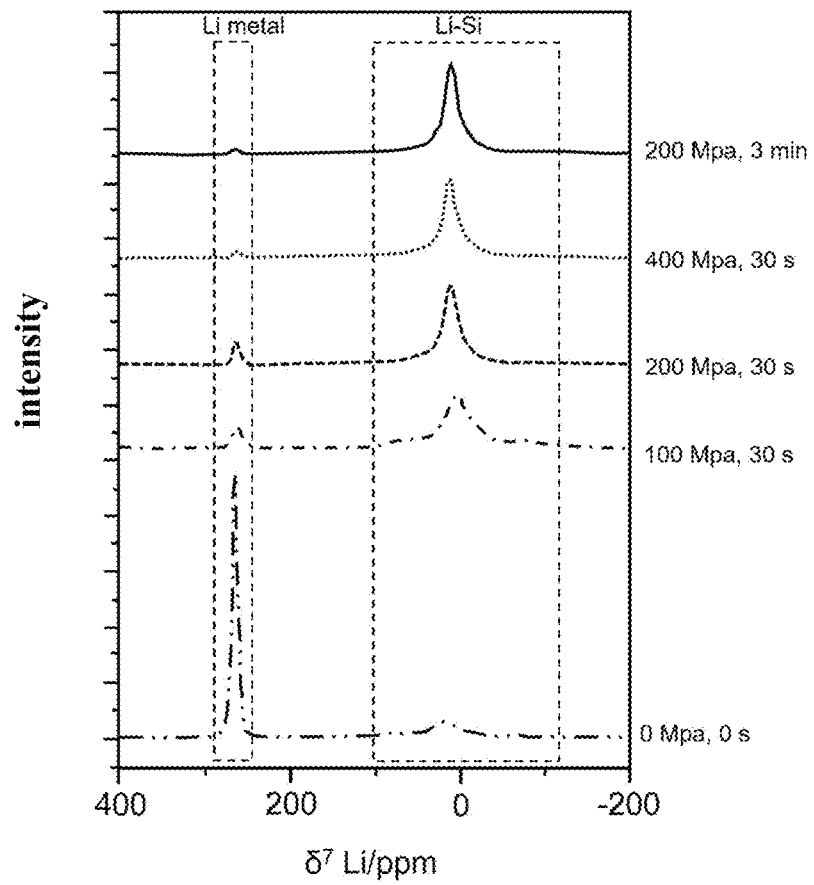

[Fig. 3]
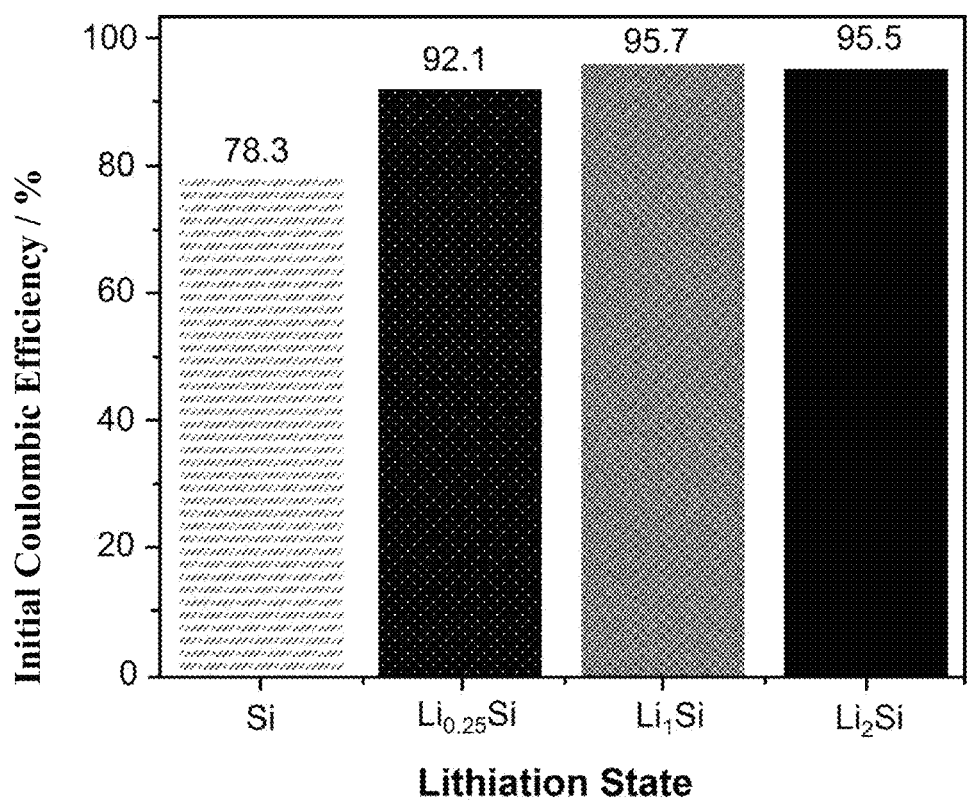

【Fig. 4】
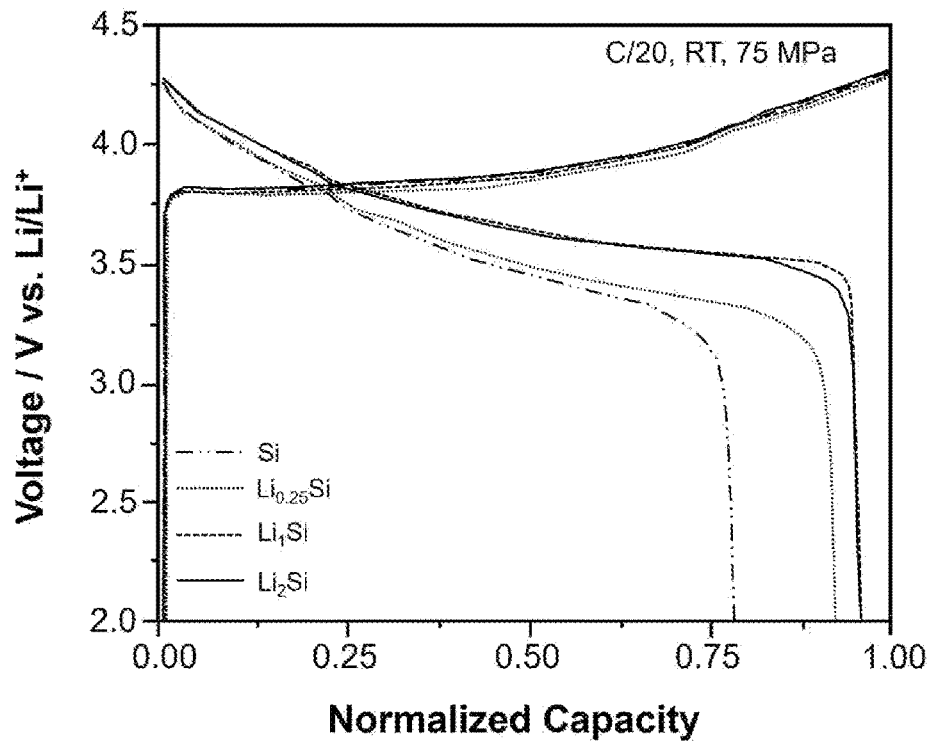
【Fig. 5】
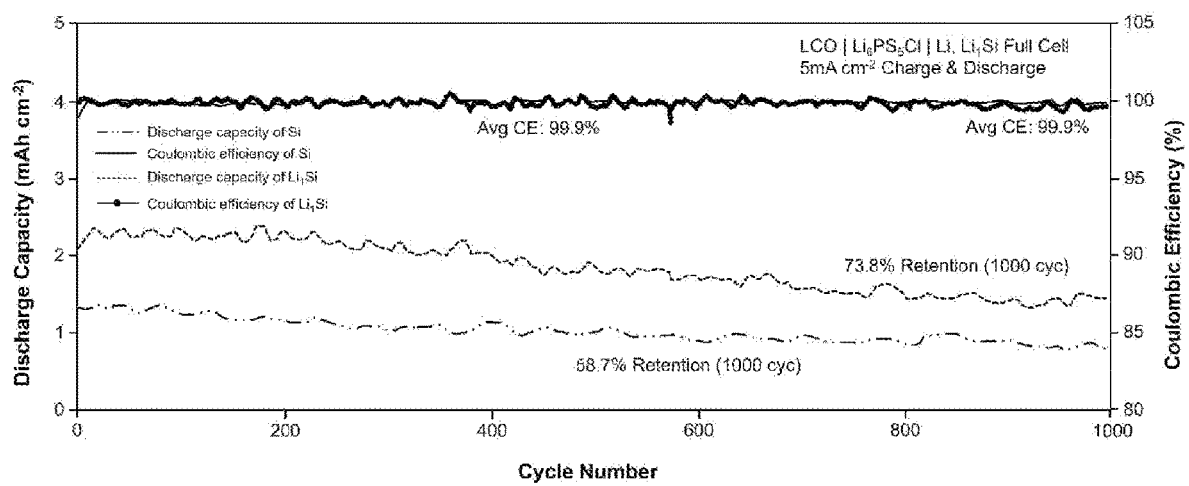

ALL-SOLID-STATE BATTERY COMPRISING A PRE-LITHIATED SILICON NEGATIVE ELECTRODE

RELATED APPLICATION DATA

The present application claims priority under 35 U.S.C. § 119(e) to U.S. Provisional Application No. 63/518,274, filed Aug. 8, 2023, the entire contents of which are herein incorporated by reference.

TECHNICAL FIELD

The present disclosure relates to a negative electrode for an all-solid-state battery and an all-solid-state battery comprising the negative electrode. More specifically, the present disclosure relates to a pre-lithiated silicon negative electrode, an all-solid-state battery comprising the same, and a preparing method thereof.

BACKGROUND ART

In a conventional lithium-ion secondary battery, a transition metal oxide-containing positive electrode active material and a carbon-containing negative electrode active material are used, and lithium-ion conductivity is secured between the positive electrode and the negative electrode by using a liquid electrolyte. However, the carbon-containing negative electrode active material has a low lithium-ion storage capacity and has limitations in increasing the charging capacity.

Recently, studies on high-capacity negative electrode active materials such as silicon (Si) as a substitute for the carbon-containing negative electrode active material are increasing. Since silicon (Si) has high electrical conductivity and exhibits high capacity characteristics compared to the carbon-containing active material, if silicon (Si) is used as a negative electrode active material, it is possible to achieve higher battery capacity and smaller battery size compared to batteries using the carbon-containing negative electrode active material.

However, there is a problem that silicon (Si) has a large volume change during charging and discharging, and cracks are easily generated accordingly, and thus, when a new surface is exposed by such cracks and comes into contact with a liquid electrolyte, as a solid electrolyte interphase (SEI) film is formed on the surface, energy density and lifetime performance are reduced due to irreversible reactions and low efficiency. In order to prevent this problem, conventionally, a method of preventing micronization was considered by using various Si nano structures together with a carbon compound and a binder material for a silicon (Si) negative electrode.

However, despite such continuous research, it is still difficult to achieve high coulombic efficiency and excellent lifetime performance of the first cycle of the cell, and thus a new approach for this is needed.

PRIOR ART DOCUMENT

Patent Document (Patent Document 1) Korean Laid-open Patent Publication No. 10-2006-0056969

DISCLOSURE

Technical Problem

It is an object of the present disclosure to provide an all-solid-state battery using silicon (Si) as a negative electrode active material.

It is another object of the present disclosure to provide an all-solid-state battery having excellent electrochemical properties such as energy density, lifetime characteristics, and coulombic efficiency.

It will be readily apparent that other objects and advantages of the present disclosure may be realized by means or methods described in the claims and combinations thereof.

Technical Solution

One aspect of the present disclosure relates to an all-solid-state battery, which comprises a negative electrode, a positive electrode and a sulfide-containing solid electrolyte between the negative electrode and the positive electrode, wherein the negative electrode includes a negative electrode active material layer containing silicon (Si), the negative electrode is pre-lithiated, and an interfacial layer is present between the solid electrolyte and the negative electrode active material layer.

In one aspect of the present disclosure, the sulfide-containing solid electrolyte is an argyrodite-based sulfide-containing solid electrolyte ($Li_6PS_5X$; X=Cl, Br, I).

In one aspect of the present disclosure, the interfacial layer is made of at least one selected from $Li_2S$, LiX (X: Cl, Br or I) or $Li_3P$.

In one aspect of the present disclosure, after charging the all-solid-state battery, the content of $Li_2S$, LiX (X: Cl, Br or I) or $Li_3P$ in the interfacial layer is 1 to 50 mol % based on 100 mol % of the total content of the solid electrolyte and the interfacial layer.

In one aspect of the present disclosure, the negative electrode active material layer contains 0.25 to 2 moles of lithium based on 1 mole of silicon.

In one aspect of the present disclosure, the silicon comprises a plurality of silicon particles, and the silicon particles have a particle diameter of 0.1 μm to 10 μm.

In one aspect of the present disclosure, in the state where the all-solid-state battery is discharged after a plurality of charge and discharge cycles, the content of lithium remaining in the negative electrode active material layer is 0.1 mol or more based on 1 mol of silicon.

In one aspect of the present disclosure, the negative electrode active material layer may further comprise a conductive material.

In one aspect of the present disclosure, the positive electrode comprises a positive electrode active material layer, the positive electrode active material layer comprises a lithium transition metal composite oxide, and the transition metal comprises one or more of Co, Mn, Ni, and Al.

In one aspect of the present disclosure, the lithium transition metal composite oxide includes at least one of the compounds represented by Formula 1 below:

$$Li_xNi_aCo_bMn_cM_zO_y \qquad \text{<Formula 1>}$$

wherein, 0.5≤x≤1.5, 0≤a≤1, 0≤b<1, 0≤c<1, 0≤z<1, 1.5<y<5, and a+b+c+z is 1 or less, and M comprises at least one selected from Ti, Zr, Nb, Mo, W, Al, Si, Ga, Ge and Sn.

Advantageous Effects

The all-solid-state battery according to the present disclosure comprises a pre-lithiated silicon negative electrode, thereby providing a battery with high energy density and increased lifetime performance.

In addition, the negative electrode can provide an all-solid-state battery with high initial conductivity and initial efficiency.

DESCRIPTION OF DRAWINGS

FIG. 1 is a diagram showing initial conductivities of the pre-lithiated silicon negative electrode according to the present disclosure and the negative electrode of the Comparative Example.

FIG. 2 is a diagram showing the change of the lithium metal phase and the pre-lithiated silicon phase in the preparing process of the pre-lithiated silicon negative electrode according to the present disclosure.

FIG. 3 is a diagram showing a comparison of initial efficiencies of the all-solid-state battery according to the present disclosure and the battery of the Comparative Example.

FIG. 4 is a diagram showing a comparison of lifetime characteristics of the all-solid-state battery according to the present disclosure and the battery of the Comparative Example.

FIG. 5 is a diagram showing Electrochemical Impedance Spectroscopy (EIS) measurements of the all-solid-state battery according to the present disclosure and the battery of the Comparative Example.

BEST MODE

Hereinafter, the present disclosure will be described in detail. Prior to this, the terms or words used in this specification and claims should not be construed as being limited to ordinary or dictionary meanings, and should be construed in a sense and concept consistent with the technical idea of the present disclosure, based on the principle that the inventor can properly define the concept of a term to describe his disclosure in the best way possible. Therefore, the aspects described in this specification and the configurations shown in the drawings are only one of the most preferred aspects of the present disclosure, and do not represent all the technical ideas of the present disclosure, and thus it should be understood that there may be various equivalents and modifications that can replace them at the time of filing of the present disclosure.

Throughout the present specification, when a part 「comprise(s) or include(s)」 a certain component, this means that it may further comprise other components without excluding other components, unless specifically stated otherwise.

In addition, the terms 「about」, 「substantially」and the like used throughout the present specification are used as meanings at or close to the value when preparing and material tolerances inherent in the stated meaning are given, and are used to prevent unfair use by unscrupulous infringers of the disclosure in which exact or absolute figures are recited to aid in the understanding of this application.

Throughout the present specification, the description of 「A and/or B」means 「A or B or both」.

The present disclosure relates to an all-solid-state battery including a solid electrolyte material as an electrolyte. Specific examples of the all-solid-state battery comprise all types of primary and secondary batteries, fuel cells, solar cells, and capacitors such as supercapacitor devices. In particular, the secondary battery is specifically a lithium ion secondary battery.

In one aspect, the all-solid-state battery according to the present disclosure includes a negative electrode, a positive electrode, and a sulfide-containing solid electrolyte interposed between the negative electrode and the positive electrode, wherein the negative electrode comprises a negative electrode active material layer including silicon (Si) as a negative electrode active material, and the negative electrode is pre-lithiated.

If lithium metal is used as a negative electrode, it has high energy density and long lifetime characteristics, but when the operating temperature is low, there is a problem that the growth of lithium dendrites intensifies and the performance of the battery deteriorates. However, in the case of the silicon negative electrode, since there is no concern about the growth of lithium dendrite, it can show excellent performance even at room temperature, which is advantageous compared to lithium metal negative electrode. On the other hand, in a battery using a liquid electrolyte, the silicon negative electrode shows excellent characteristics of high-rate charging when the operating temperature is low (for example, below room temperature), while it has low reversible areal capacities. This has the aspect that it is not easy to introduce a high-loading electrode in the case of a cell comprising the liquid electrolyte. The battery according to the present disclosure has the advantage of being able to solve the above problems.

Hereinafter, the configuration and effects of the present disclosure will be described in detail.

In one aspect of the present disclosure, the negative electrode may comprise a negative electrode active material layer including silicon, and the negative electrode may be pre-lithiated.

Herein, pre-lithiation means preserving the amount of lithium ions that can be used reversibly by additionally supplying enough lithium to be consumed during the electrochemical cycle to the negative electrode before assembling the battery, and maximizing the energy density of the battery equipped with the high-capacity negative electrode.

The negative electrode active material layer including silicon may be any negative electrode including a silicon single body, a silicon alloy or a silicon compound.

The silicon single body may be monocrystalline silicon, polycrystalline silicon, or amorphous nano silicon.

As the silicon alloy, an alloy containing a second element other than silicon, including at least one selected from tin, aluminum, nickel, copper, iron, cobalt, manganese, zinc, indium, silver, titanium, germanium, bismuth, antimony and chromium can be mentioned.

As the silicon compound, compounds containing oxygen and carbon may be mentioned, and the silicon compound may include an element selected from tin, nickel, copper, iron, cobalt, manganese, zinc, indium, silver, titanium, germanium, bismuth, antimony and chromium, in addition to silicon.

Specific examples of silicon alloys and compounds comprise $SiB_4$, $SiB_6$, $Mg_2Si$, $Ni_2Si$, $TiSi_2$, $MoSi_2$, $CoSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (0<v≤2), $SnO_w$ (0<w≤2), LiSiO and the like.

The negative electrode may include other negative electrode active materials such as graphite, in addition to silicon.

In one aspect of the present disclosure, the silicon is composed of a plurality of silicon particles, and the silicon particles may have a particle size of 0.1 μm to 10 μm.

In one aspect of the present disclosure, lithium used for the pre-lithiated negative electrode may be lithium powder, lithium oxide powder, lithium carbide powder, or lithium nitride powder.

The content of lithium in the pre-lithiated silicon negative electrode may be 3 to 33% by weight based on the total weight of the negative electrode. Specifically, the content of lithium in the pre-lithiated silicon negative electrode may be 3% by weight or more, 3.5% by weight or more, 4% by weight or more, 4.5% by weight or more, 5% by weight or more, 5.5% by weight or more, 6% by weight or more, 6.5% by weight or more, 7% by weight or more, 7.5% by weight or more, 8% by weight or more, or 33% by weight or less, 32.5% by weight or less, 32% by weight or less, 31.5% by weight or less, 31% by weight or less, 30.5% by weight or less, 30% by weight or less, 29.5% by weight or less, 29% by weight or less, based on the total weight of the negative electrode.

The content of lithium in the pre-lithiated silicon negative electrode may be 0.25 to 2 mol based on 1 mol of silicon (Si). Specifically, the content of lithium in the pre-lithiated silicon negative electrode may be 0.25 mol or more, 0.30 mol or more, 0.35 mol or more, 0.40 mol or more, 0.45 mol or more, 0.50 mol or more, 0.55 mol or more, 0.60 mol or more, 0.65 mol or more, 0.70 mol or more, 0.75 mol or more, 0.80 mol or more, 0.85 mol or more, 0.90 mol or more, or 2.0 mol or less, 1.95 mol or less, 1.90 mol or less, 1.85 mol or less, 1.80 mol or less, 1.75 mol or less, 1.70 mol or less, 1.65 mol or less, 1.60 mol or less, 1.55 mol or less, 1.50 mol or less, 1.45 mol or less, 1.40 mol or less, 1.35 mol or less, 1.30 mol or less, 1.25 mol or less, 1.20 mol or less, 1.15 mol or less, 1.10 mol or less, 1.05 mol or less, 1.0 mol or less, based on 1 mol of silicon (Si).

FIG. 2 is a diagram showing the change of the lithium metal phase and the pre-lithiated silicon phase in the preparing process of the pre-lithiated silicon negative electrode according to the present disclosure. Specifically, in the process of preparing a negative electrode, after mixing lithium metal powder and silicon, it was confirmed whether pre-lithiated silicon was actually formed by varying the pressing pressure and pressing time. As a result of confirmation through lithium solid state NMR ($^7$Li solid state NMR), it was confirmed that as the pressing pressure and pressing time are increased, the lithium metal phase is decreased and the pre-lithiated silicon phase is increased.

In one aspect of the present disclosure, the initial conductivity of the negative electrode active material layer may be increased as the content of lithium based on 1 mol of silicon (Si) is increased. FIG. 1 is a diagram showing initial conductivities of the pre-lithiated silicon negative electrode according to the present disclosure and the negative electrode of the Comparative Example. The initial conductivity of the pre-lithiated silicon negative electrode according to the present disclosure may be $1.0 \times 10^{-3}$ S/cm to $1.0 \times 10$ S/cm.

In one aspect of the present disclosure, the initial efficiency of the negative electrode active material layer may be increased as the content of lithium is increased based on 1 mol of silicon (Si). FIG. 3 is a diagram showing a comparison of initial efficiencies of the all-solid-state battery according to the present disclosure and the battery of the Comparative Example. The initial efficiency of the all-solid-state battery according to the present disclosure may be 90% and more and 99% or less.

In one aspect of the present disclosure, the negative electrode active material layer may comprise a conductive material. In particular, the conductive material may be a carbon-containing conductive material such as carbon black. If the conductive material is contained in the negative electrode active material layer, the content of the conductive material may be less than 1.0% by weight. If the content of the conductive material exceeds 1.0% by weight, there is a problem that the irreversible decomposition reaction of the solid electrolyte is accelerated, thereby resulting in deterioration of resistance characteristics and lifetime performance of the battery.

In one aspect of the present disclosure, the negative electrode active material layer may be composed of only silicon (Si) and lithium or may be composed to further contain a binder resin in addition to the silicon (Si) and lithium. In that case, the binder resin may be contained in an amount of less than 10% by weight, less than 1% by weight, or less than 0.1% by weight based on 100% by weight of the negative electrode active material layer.

The negative electrode may comprise a negative electrode current collector. In that case, the negative electrode active material layer may be formed on at least one surface of the current collector. In one aspect of the present disclosure, the negative electrode active material layer may have a thickness in the range of about 10 μm to 100 μm, and, for example, may be formed to a thickness of 10 μm to 70 μm or 10 μm to 50 μm.

In one aspect of the present disclosure, in a state where the all-solid-state battery is discharged after a plurality of charge/discharge cycles, the content of lithium remaining in the negative electrode active material layer may be 0.1 mol or more based on 1 mol of silicon. If the content of lithium remaining in the negative electrode active material layer is less than 0.1 mol, when a plurality of charge and discharge cycles are performed, there is a problem that lifetime performance is significantly deteriorated.

In addition, the content of lithium remaining in the negative electrode active material layer is 2% by weight or more based on the total weight of the negative electrode. If the content of lithium remaining in the negative electrode active material layer is less than 2% by weight, when a plurality of charge/discharge cycles are performed, there is a problem that lifetime performance is significantly deteriorated.

In one aspect of the present disclosure, the negative electrode active material layer may be prepared, for example, in the following manner.

In one aspect of the present disclosure, the negative electrode active material layer is prepared by mixing silicon powder and lithium powder and applying pressure. Alternatively, the pre-lithiation may be proceeded by placing lithium metal on the silicon negative electrode and applying a constant force from above and below to directly contact the silicon negative electrode and lithium metal. Similar to the initial irreversible situation by direct contact between the silicon negative electrode and lithium metal, since lithium reacts with silicon active material to form an alloy, and irreversibility occurs less in subsequent charging by the corresponding amount of reaction, it becomes possible to control the initial irreversibility of the electrode. The pressurization is not limited to a special method, and any known pressurization method may be selected and applied.

In one aspect of the present disclosure, the solid electrolyte may comprise a sulfide-containing solid electrolyte. The sulfide-containing solid electrolyte may include an azirodite-based sulfide-containing solid electrolyte, which contains sulfur (S) and has the ionic conductivity of a metal belonging to Group 1 or 2 of the periodic table.

In the present disclosure, the average particle diameter of the sulfide-containing solid electrolyte can be adjusted to a range suitable for an all-solid-state battery. In one specific aspect of the present disclosure, the solid electrolyte may have an average particle diameter of 0.1 μm to 50 μm. Also, in one aspect of the present disclosure, the selected solid electrolyte has an ionic conductivity of $1\times10^{-5}$ S/cm, preferably $1\times10^{-3}$ S/cm or more.

In one aspect of the present disclosure, the solid electrolyte layer may be prepared, for example, by the following method.

First, the solid electrolyte is prepared. The solid electrolyte may be prepared by obtaining a commercially available product or by preparing the following method. The solid electrolyte can be prepared in the following method.

First, LiCl, $Li_2S$ and $P_2S_5$ are mixed in stoichiometric amounts and milled by a method such as a planetary ball mill to obtain a homogeneous mixture. The target $Li_6PS_5Cl$ solid electrolyte may be obtained by heat-treating the mixture at a high temperature for a predetermined time. The heat treatment may be performed at about 550° C. and the heat treatment time may be about 8 hours.

Next, the solid electrolyte material is put into and dispersed in a predetermined organic solvent to prepare a slurry, which is applied to a release plate, etc., dried, and molded into a sheet shape. If necessary, a solid electrolyte layer may be obtained by pressing the sheet-like product.

In one aspect of the present disclosure, the all-solid-state battery may include an interfacial layer between the solid electrolyte and the negative electrode active material layer. The interfacial layer may be formed between the sulfide-containing solid electrolyte and the pre-lithiated silicon negative electrode.

The interfacial layer may be composed of at least one selected from $Li_2S$, LiX (X: Cl, Br or I) or $Li_3P$.

After charging the all-solid-state battery, the content of $Li_2S$, LiX (X: Cl, Br or I) or $Li_3P$ in the interfacial layer may be 1 to 50 mol % based on 100 mol % of the total content of the solid electrolyte and the interfacial layer. Specifically, after charging the all-solid-state battery, the content of $Li_2S$, LiX (X: Cl, Br or I) or $Li_3P$ in the interfacial layer may be 1 mol % or more, 5 mol % or more, 10 mol % or more, 15 mol % or more, 20 mol % or more, or 50 mol % or less, 45 mol % or less, 40 mol % or less, based on 100 mol % of the total content of the solid electrolyte and the interface layer. If the content of $Li_2S$, LiX (X: Cl, Br or I) or $Li_3P$ in the interfacial layer exceeds 50 mol % based on 100 mol % of the total content of the solid electrolyte and the interfacial layer, there is a problem that as the resistance of the battery is increased, the capacity and rate characteristics of the battery are deteriorated.

In one aspect of the present disclosure, the positive electrode may comprise a positive electrode active material layer including a positive electrode active material, a positive electrode conductive material, and a solid electrolyte. The positive electrode active material layer may further include a binder resin for a positive electrode as needed. In addition, the positive electrode may comprise a current collector as needed, and the positive electrode active material layer may be disposed on at least one surface of the current collector.

In one aspect of the present disclosure, the positive electrode active material may comprise at least one or a mixture of two or more of lithium cobalt oxide ($LiCoO_2$), lithium nickel oxide ($LiNiO_2$), lithium manganese oxide such as the Formula, $Li_{1+x}Mn_{2-x}O_4$ (wherein, x is 0 to 0.33, for example, $LiMn_2O_4$), $LiMnO_3$, $LiMn_2O_3$, and $LiMnO_2$, lithium copper oxide ($Li_2CuO_2$); vanadium oxide such as $LiV_3O_8$, $LiV_2O_4$, $V_2O_5$, $Cu_2V_2O_7$ and the like, Ni site-type lithium nickel oxide represented by the Formula, $LiNi_{1-x}M_xO_2$ (wherein, M=Co, Mn, Al, Cu, Fe, Mg, B or Ga, 0<x<1), for example, $LiNi_{1-z}(Co,Mn,Al)_zO_2$ (0<z<1); lithium manganese composite oxide represented by the Formula, $LiMn_{2-x}M_xO_4$ (wherein, M=Co, Ni, Fe, Cr, Zn or Ta, x=0.01~1, for example, $LiMn_{1.5}Ni_{0.5}O_4$) or $Li_2Mn_3MO_8$ (wherein, M=Fe, Co, Ni, Cu or Zn); $LiMn_2O_4$ in which a part of Li in the Formula is substituted with an alkaline earth metal ion; disulfide compounds; $Fe_2(MoO_4)_3$, lithium iron phosphate ($LiFePO_4$). In one aspect of the present disclosure, in order to improve the conductivity of the lithium iron phosphate, all or at least part of the surface of the active material particle may be coated with a carbon material.

Preferably, the positive electrode active material may comprise at least one selected from lithium nickel cobalt manganese oxide (for example, $Li(Ni,Co,Mn)O_2$, $LiNi_{1-z}(Co,Mn,Al)_zO_2$ (0<z<1)), lithium iron phosphate (for example, $LiFePO_4/C$), lithium nickel manganese spinel (for example, $LiNi_{0.5}Mn_{1.5}O_4$), lithium nickel cobalt aluminium oxide (for example, $Li(Ni,Co,Al)O_2$), lithium manganese oxide (for example, $LiMn_2O_4$) and lithium cobalt oxide (for example, $LiCoO_2$).

In the present disclosure, most preferably, the positive electrode active material comprises lithium transition metal composite oxide, and the transition metal may comprise at least one of Co, Mn, Ni, and Al.

In one aspect of the present disclosure, the lithium transition metal composite oxide may include at least one of the compounds represented by Formula 1 below.

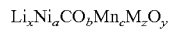  <Formula 1> wherein, $0.5 \leq x \leq 1.5$, $0 \leq a \leq 1$, $0 \leq b < 1$, $0 \leq c < 1$, $0 \leq z < 1$, $1.5 < y < 5$, and a+b+c+z is 1 or less, and M comprises at least one selected from Ti, Zr, Nb, Mo, W, Al, Si, Ga, Ge and Sn.

In one specific aspect of the present disclosure, the positive electrode conductive material may be, for example, any one selected from the group consisting of graphite, carbon black, carbon fiber or metal fiber, metal powder, conductive whisker, conductive metal oxide, activated carbon and polyphenylene derivatives, or a mixture of two or more conductive materials thereof. More specifically, the positive electrode conductive material may be one or a mixture of two or more conductive materials selected from the group consisting of natural graphite, artificial graphite, super-p, acetylene black, Ketjen black, channel black, furnace black, lamp black, thermal black, Denka black, aluminum powder, nickel powder, zinc oxide, potassium titanate and titanium oxide.

The current collector is not particularly limited as long as it does not cause chemical change in the battery and has high electrical conductivity. As the current collector, for example, stainless steel, copper, aluminum, nickel, titanium, sintered carbon, or aluminum or stainless steel surface-treated with carbon, nickel, titanium, or silver may be used.

As the positive electrode binder resin, polymers commonly used in electrodes in the art may be used. Non-limiting examples of the binder resin comprise polyvinylidene difluoride, polyvinylidene fluoride-co-hexafluoropropylene, polyvinylidene fluoride-cotrichloroethylene, polymethylmethacrylate, polyetylexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetatepropionate, cyanoethylpullulan, cyanoethylpolyvinylalcohol, cyanoethylcellulose, cyanoethylsucrose, pullulan, carboxyl methyl cellulose and the like, but are not limited thereto.

In one aspect of the present disclosure, the solid electrolyte included in the positive electrode may comprise at least one selected from polymer-containing solid electrolyte, oxide-containing solid electrolyte, and sulfide-containing solid electrolyte. In one aspect of the present disclosure, the positive electrode active material may preferably comprise the sulfide-containing solid electrolyte described for the solid electrolyte.

In one aspect of the present disclosure, in the positive electrode, the positive electrode active material is preferably contained in an amount of 70% by weight or more based on 100% by weight of the positive electrode active material layer. In addition, in the positive electrode, the solid electrolyte is preferably contained in an amount of 10% by weight to 30% by weight based on 100% by weight of the positive electrode active material layer.

Meanwhile, in one specific aspect of the present disclosure, the positive electrode may have a loading amount (per electrode area) of 5 mAh/cm$^2$ or more, 6 mAh/cm$^2$ or more, or 10 mAh/cm$^2$ or more.

In the battery according to the present disclosure, even when such a high-loading positive electrode is applied, the battery can be operated at an electrochemically stable level.

Meanwhile, in one specific aspect of the present disclosure, the positive electrode active material layer may be obtained by casting a slurry prepared by adding the positive electrode active material, the conductive material, the binder resin, and the solid electrolyte to an appropriate solvent, or may be obtained by a manufacturing method according to a dry mixing process without a solvent. Meanwhile, in one aspect of the present disclosure, in terms of achieving homogeneous mixing of the components of the positive electrode in the positive electrode and obtaining a high-loading positive electrode through this, the positive electrode is preferably obtained by a dry mixing process without using a solvent.

The preparing method of the positive electrode active material layer by the dry mixing method may be described for example as follows. First, materials for the positive electrode comprising the positive electrode active material, the conductive material, and the binder resin are put into a mixing device and mechanically mixed to obtain a mixture. As the mixing device, any one can be used as long as it can secure a relatively uniform mixed phase, such as a known mixer or stirrer, and it is not limited to any one specific device. Meanwhile, in one aspect of the present disclosure, in the mixing process, a heating process may be comprised to improve the dispersibility of the solids and induce the formation of fibers in the binder resin. When the temperature is raised, the temperature may be appropriately controlled within a range of about 30° C. to 100° C. Next, a positive electrode active material layer can be extracted from the mixture in the form of an electrode (wide film form) using an extruder, and its thickness can be adjusted through a pressurization process. The positive electrode active material layer may be applied to an electrode without a current collector, or may be prepared in the form of a positive electrode comprising a current collector by attaching the current collector to the obtained positive electrode active material layer.

Hereinafter, the present disclosure will be further detailed through the Examples, but the following Examples are intended to illustrate the present disclosure, and the scope of the present disclosure is not limited to these only. The Examples of the present disclosure are provided to more completely explain the present disclosure to those with average knowledge in the art.

Example 1

(1) Preparation of Negative Electrode

Silicon (Si) powder (Alfa Aesar, particle diameter 3 μm to 5 μm) and lithium (Li) powder (FMC Corporation) were added according to the molar ratio, mixed using a vortex mixer, and then pressed between two titanium rods at 200 MPa to prepare a pre-lithiated silicon negative electrode.

The molar ratio of the silicon powder and the lithium powder was set to 1:0.25.

The thickness of the prepared negative electrode was 45 μm, and the loading amount of the negative electrode was 13.2 mAh/cm$^2$.

(2) Preparation of Positive Electrode

LCO (MTI Corporation, LiCoO$_2$), Li$_6$PS$_5$Cl (NEI Corporation), VGCF (Sigma Aldrich (Graphitized, Ironfree)) were mixed in a weight ratio of 66:31:3, dry mixed in a heated mortar, and then pressurized at 370 MPa between two titanium rods to prepare a positive electrode.

The thickness of the prepared positive electrode was 70 μm, and the loading amount of the positive electrode was 3.0 mAh/cm$^2$.

(3) Preparation of Solid Electrolyte Layer 75 mg of Li$_6$PS$_5$Cl (NEI Corporation) was pressed between two titanium rods at 370 MPa to prepare a solid electrolyte layer with a thickness of 700 μm.

(4) Preparation of Battery

The negative electrode, the positive electrode, and the solid electrolyte layer prepared as described above were pressed at a pressure of 370 Mpa using a titanium plunger to prepare a battery. The titanium plunger was used as a current collector.

Example 2

A battery was prepared in the same manner as in Example 1, except that the molar ratio of the silicon powder and the lithium powder was set to 1:1.

Example 3

A battery was prepared in the same manner as in Example 1, except that the molar ratio of the silicon powder and the lithium powder was set to 1:2.

Comparative Example 1

Silicon powder (Alfa Aesar, particle diameter 3 μm to 5 μm) was pressed between two titanium rods at 200 MPa to prepare a silicon negative electrode.

A positive electrode and a solid electrolyte layer were prepared in the same manner as in Example 1, and the negative electrode, the positive electrode, and the solid electrolyte layer were pressed at a pressure of 370 Mpa using a titanium plunger to prepare a battery. The titanium plunger was used as a current collector.

Comparative Example 2

A battery was prepared in the same manner as in Example 1, except that the molar ratio of the silicon powder and the lithium powder was set to 1:3.

Experimental Example

Experimental Example 1: Lifetime characteristics of battery

The lifetime characteristics of the batteries of Examples 1 to 3 and the battery of Comparative Example 1 were compared, and the results are shown in FIG. 4. FIG. 4 confirms the lifetime characteristics at room temperature (25° C.). In the pre-lithiated silicon negative electrode, it was confirmed that Example 3, which has a high lithium content, has the highest capacity retention rate.

Experimental Example 2: Evaluation of Electrochemical Performance of Battery The capacity retention rate and coulombic efficiency of the batteries of Examples 1 to 3 and the battery of Comparative Example 1 after charging and discharging for 1000 cycles were compared, and results are shown in FIG. 5. FIG. 5 confirms the capacity retention rate and coulombic efficiency after charging and discharging 1000 cycles at 5 mA/cm$^2$ at room temperature. It was confirmed that the battery of Comparative Example 1 shows a capacity retention rate of about 20% and an average coulombic efficiency of 58.7%, whereas the battery of Example 3 shows a capacity retention rate of 80% and an average coulombic efficiency of 99.9%.

Experimental Example 3: X-Ray Photoelectron Spectroscopy Measurement of the Interface Between the Solid Electrolyte Layer and the Negative Electrode Active Material Layer The formation of Li$_2$S in the interfacial layer between the solid electrolyte and the pre-lithiated negative electrode active material layer was confirmed before and after charging the battery. Table 1 below shows measurement data of X-ray Photoelectron Spectroscopy (XPS) on the solid electrolyte layer and the interface layer of Example 2 and Comparative Example 2.

TABLE 1

| | S 2p peak/mol ratio | PS$_4^{3-}$(LPSCl) | Li$_2$S |
|---|---|---|---|
| Example 2 | before charging (mol %) | 100 | 0 |
| | after charging (mol %) | 62 | 38 |
| Comparative Example 2 | before charging (mol %) | 100 | 0 |
| | after charging (mol %) | 12 | 88 |

As shown in Table 1 above, it can be seen that in the case of Example 2, an appropriate amount of Li$_2$S was formed at the interface between the silicon negative electrode and the solid electrolyte layer, thereby suppressing the reduction decomposition of additional electrolytes and improving the efficiency of the battery. On the other hand, it can be seen that in the case of Comparative Example 2, after charging the battery, an excessive amount of Li$_2$S was formed in the interfacial layer, which increased the resistance and degraded the performance of the battery.

Experimental Example 4: Measurement of the Remaining Amount of Lithium in the Negative Electrode after Performing the Charging/Discharging Cycles After charging and discharging the batteries prepared in Examples 1 to 3 and Comparative Example 1 ten times, the battery was over-discharged to 0 V, and the remaining amount of lithium in the negative electrode was measured. The results are shown in Table 2 below.

TABLE 2

| | Example 1 | Example 2 | Example 3 | Comparative Example 1 |
|---|---|---|---|---|
| Remaining amount of lithium per mole of silicon (mol) | 0.1 | 0.67 | 1.42 | 0.02 |
| Remaining amount of lithium in the negative electrode (% by weight) | 2.1 | 13.8 | 25.2 | 0.5 |

As in Table 2 above, in the case of batteries containing pre-lithiated negative electrodes prepared in Examples 1 to 3 above, even after multiple cycles of charging and discharging, the remaining amount of lithium in the negative electrode could be confirmed. The content of lithium remaining in the negative electrode according to Examples 1 to 3 was 0.1 mol or more based on 1 mol of silicon and 2% by weight or more based on the total weight of the negative electrode. On the other hand, in the case of the negative electrode according to Comparative Example 1, after charging and discharging multiple times, the content of lithium remaining in the negative electrode was very small as 0.02 mol based on 1 mol of silicon and 0.5% by weight based on the total weight of the negative electrode. It was found that if the content of lithium remaining in the negative electrode after the charge/discharge is low, the performance of the battery is degraded.

Experimental Example 5: Efficiency of Battery Depending on Li and Si Ratio

FIG. 1 shows initial conductivities for negative electrodes according to Examples 1 to 3 and Comparative Examples 1 to 2. It was confirmed that for the initial conductivities of the negative electrodes according to Examples 1 to 3, the higher the lithium ratio in the pre-lithiated silicon negative electrode based on 1 mol of silicon, the higher the initial conductivity. On the other hand, the silicon negative electrode according to Comparative Example 1 had an initial conductivity of 2.5×10$^{-4}$ S/cm, which was very low compared to the pre-lithiated silicon negative electrode. In addition, in the case of Comparative Example 2, when the lithium ratio exceeds 3 based on 1 mole of silicon in the pre-lithiated silicon negative electrode, the initial efficiency was not measured. That is, in the case of a negative electrode containing 3 mol or more of lithium based on 1 mol of silicon, it was confirmed that the efficiency of the battery is rapidly decreased.

The invention claimed is:

1. An all-solid-state battery, comprising:
   a negative electrode comprising a negative electrode active material layer, said negative electrode active material layer comprising silicon;
   a positive electrode comprising lithium cobalt oxide (LCO), Li$_6$PS$_5$Cl and vapor grown carbon fibers;
   a sulfide-containing solid electrolyte between the negative electrode and the positive electrode; and
   an interfacial layer between the sulfide-containing solid electrolyte and the negative electrode active material layer, wherein:

the negative electrode is pre-lithiated, wherein the negative electrode active material layer contains 0.25 mol to 2 mol of lithium based on 1 mol of silicon, wherein the sulfide-containing solid electrolyte is an argyrodite-based sulfide-containing solid electrolyte $Li_6PS_5Cl$, and wherein the interfacial layer comprises $Li_2S$.

2. The all-solid-state battery according to claim 1, wherein the negative electrode active material layer contains 1 mol to 2 mol of lithium based on 1 mol of silicon.

3. The all-solid-state battery according to claim 1, wherein after charging the all-solid-state battery, a content of $Li_2S$ in the interfacial layer is 1 mol % to 50 mol % based on 100 mol % of a total content of the sulfide-containing solid electrolyte and the interfacial layer.

4. The all-solid-state battery according to claim 3, wherein after charging the all-solid-state battery, a content of $Li_2S$ in the interfacial layer is 5 mol % to 45 mol % based on 100 mol % of a total content of the sulfide-containing solid electrolyte and the interfacial layer.

5. The all-solid-state battery according to claim 3, wherein after charging the all-solid-state battery, a content of $Li_2S$ in the interfacial layer is 10 mol % to 40 mol % based on 100 mol % of a total content of the sulfide-containing solid electrolyte and the interfacial layer.

6. The all-solid-state battery according to claim 1, wherein the silicon comprises a plurality of silicon particles, and the silicon particles have a particle size of 0.1 μm to 10 μm.

7. The all-solid-state battery according to claim 1, wherein a content of lithium remaining in the negative electrode active material layer is 0.1 mol or more based on 1 mol of silicon, in a state where the all-solid-state battery is discharged after a plurality of charging/discharging cycles.

8. The all-solid-state battery according to claim 1, wherein the negative electrode active material layer further comprises a conductive material.

9. The all-solid-state battery according to claim 1, wherein the negative electrode active material layer contains 0.5 mol to 1.5 mol of lithium based on 1 mol of silicon.

10. The all-solid-state battery according to claim 1, wherein the negative electrode active material layer contains 0.75 mol to 1.25 mol of lithium based on 1 mol of silicon.

\* \* \* \* \*